May 13, 1969 — N. G. BRANSON — 3,443,797
INSTRUMENT FOR MEASURING CAVITATION INTENSITY IN A LIQUID
Filed Nov. 26, 1965

Norman G. Branson
INVENTOR.

BY Erwin B. Steinberg
Agent

United States Patent Office 3,443,797
Patented May 13, 1969

3,443,797
INSTRUMENT FOR MEASURING CAVITATION INTENSITY IN A LIQUID
Norman G. Branson, Stamford, Conn., assignor to Branson Instruments, Incorporated, Stamford, Conn.
Filed Nov. 26, 1965, Ser. No. 509,834
Int. Cl. G01n 29/00; G01h 3/00
U.S. Cl. 259—72                              6 Claims

ABSTRACT OF THE DISCLOSURE

In order to measure the cavitation intensity in an ultrasonically agitated liquid piezoelectric probe is immersed therein and coupled to a measuring circuit which passes signals in the radio frequency range, substantially above one MHz. The circuit includes a balanced bridge and a resistive element which is heated by the radio frequency signals, the change of resistance of said resistive element being indicative of the cavitation intensity.

---

Figure 1:
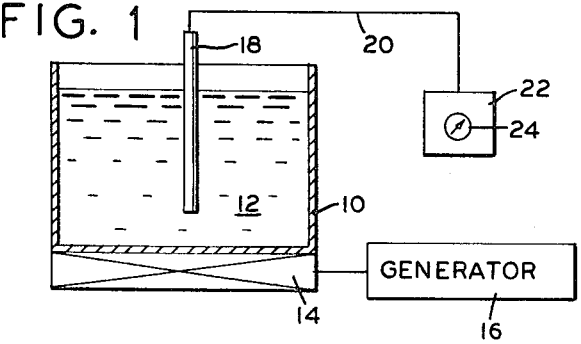

The cleaning of soiled parts in a liquid which is cavitated by means of ultrasonic energy is a well-established industrial process. Many difficulties are experienced, however, in determining the degree of cavitation intensity and various empirical guide lines have been established to provide, what is considered, maximum cavitation intensity. Sometimes the operator is instructed to tune the ultrasonic generator until maximum cavitation noise is heard, other times an aluminum foil is inserted into the liquid and various adjustments are tried until a high concentration of pin holes is detected. While these adjustments may, to some degree, provide an initial setting of the generator controls, it is difficult to discern whether a unit operating on a production line is continuing to run at maximum cavitation intensity. As is well known, contamination of the liquid by removed soil, the quantity of liquid, and the amount of load immersed in the tank, all have an effect upon the cavitation intensity of a cleaning unit. Moreover, it has been found extremely difficult to compare different cleaning units with each other in order to determine which unit might provide the best cleaning performance.

It is apparent that the effectiveness of a cleaning unit depends upon its ability to remove soil from the surface of a contaminated article. It is known, moreover, that this soil removal is dependent upon the degree of cavitation intensity established by the ultrasonic energy within the liquid or solvent. Several tests have been developed to test the ability of a cleaning unit to remove such soil and such tests are known, for instance, as the chlorine release test, or the measurement of soil removal by a radioactive tracer material. Both tests, while strictly designed to measure cavitation intensity, are essentially laboratory methods which require careful planning and execution. They are not suitable for a quick and easy measurement, or for monitoring the status of a cleaning unit which is operating on a more or less continuing basis.

A principal object of this invention is, therefore, the provision of a novel instrument for measuring the cavitation intensity in a sonically activated liquid, the instrument providing an instantaneous measurement of the cavitation intensity.

Another object of this invention is the provision of an electrical instrument for measuring the intensity of cavitation in a liquid, such instrument being eminently suited for monitoring purposes.

Another object of this invention is the provision of an electrical instrument for measuring cavitation intensity in a liquid, the instrument indication providing excellent correlation with the chlorine release and radioactive soil removal test methods.

A further object of this invention is the provision of an electrical instrument for measuring the cavitation intensity in an ultrasonically activated liquid, the instrument being suited to provide an immediate indication of the cavitation intensity.

A still further object of this invention is the provision of an instrument for determining and measuring the cavitation intensity in a liquid, such instrument being readily operated by unskilled or semi-skilled operating personnel.

Figure 2:
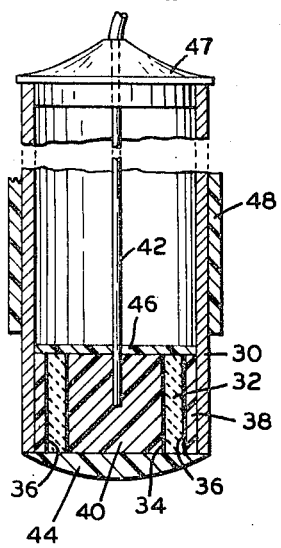
Figure 4:
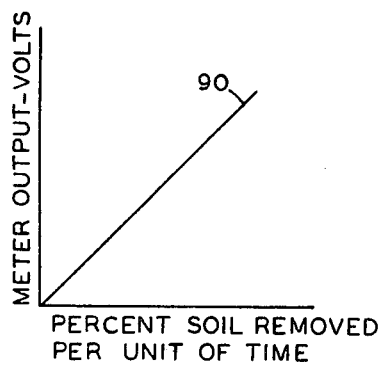
Figure 3:
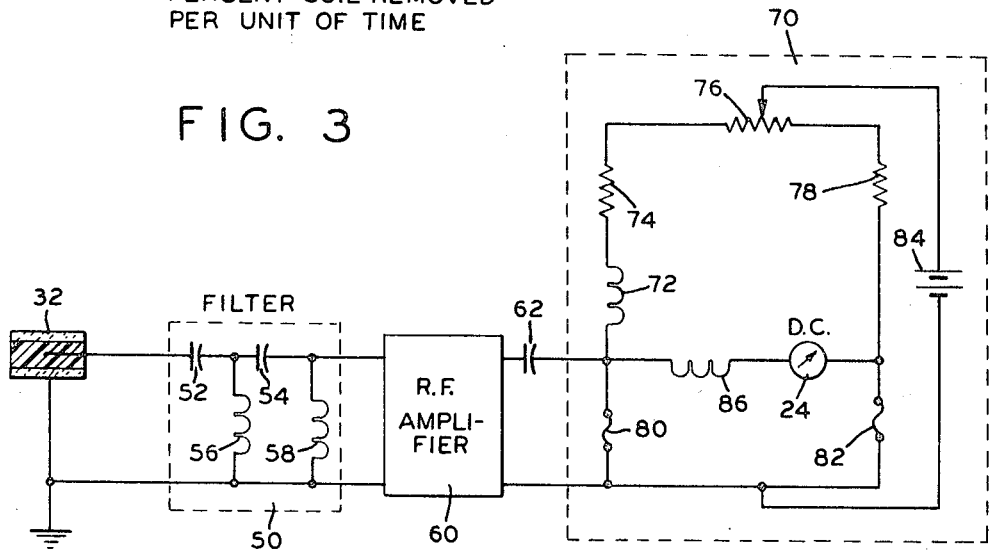
Figure 5:
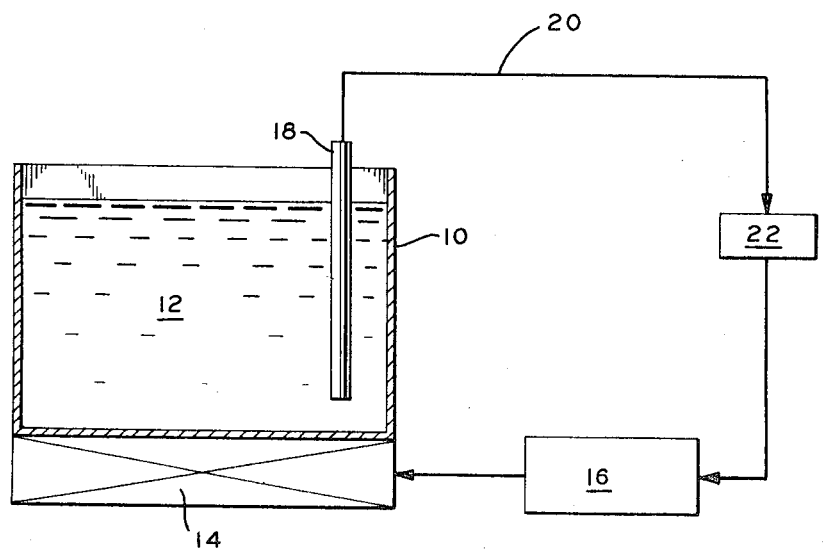

Further and still other objects of this invention will be more clearly apparent by reference to the following description when taken in conjunction with the accompanying drawings, in which:

FIGURE 1 is a schematic illustration of the general arrangement of a cavitated liquid and the instrument;
FIGURE 2 is a sectional view of the probe portion of the instrument;
FIGURE 3 is a schematic electrical circuit diagram;
FIGURE 4 is a graph of the results obtained with the instrument, and
FIGURE 5 is a schematic illustration of the present invention used in a feedback circuit.

Referring now to the figures and FIGURES 1 in particular, numeral 10 identifies a tank which is filled with a liquid 12, such as water or a solvent, for instance "Freon." The underside of the tank is provided with a jacket 14 which encloses a plurality of electromechanical transducers which are coupled to the underside of the tank. The transducers may be of the electrostrictive or of the magnetostrictive kind as is well known to those skilled in the art. The transducers are energized by a generator 16 which provides electrical energy at ultrasonic frequency, typically 28, 20, 25, or 40 kilocycles per second.

The transducers, when energized with this high frequency electrical energy, cause high intensity vibrations in the liquid 12, thereby producing cavitation which is defined generally as the formation and collapse of gas- or vapor-bubbles in the liquid. This phenomenon reflects itself as a highly efficient scrubbing of the surface of an article which is immersed in the cavitated liquid and the greater the intensity of the cavitation, the better the cleaning action. In order to measure the intensity of this cavitation, there is provided a probe 18, which is immersed in the liquid 12 and connected via a cable 20 to an electrical circuit 22 having an indicating meter 24. The degree of cavitation is visible by the deflection of the pointer of the meter 24.

FIGURE 2 illustrates the probe construction. It comprises a thin stainless steel tubing 30, about 6 mm. outside diameter, which carries at its lower end a cylinder 32 made of piezoelectrical material. The inside surface and the outside surface of this cylinder are coated with a metallic layer, 34 and 36 respectively, in order to provide electrode surfaces. The small gap between the surface layer 36 and the inside surface of the tubing 30 is filled with electrically conductive epoxy material 38, and the interior space of the piezoelectric cylinder is filled with a plug 40 of electrically conductive epoxy material to which a conductor 42 is connected. Therefore, the tubing 30 and the conductor 42 comprise the two electrical circuit connections across the piezoelectric cylinder 32.

The front end of the tubing 30 and the piezoelectric cylinder 32 are covered by a layer of insulating epoxy resin 44, and the rear surface of the cylinder 32 is protected by a layer 46 of insulating epoxy resin. The conductor 42 is fed out of the tubing 30 by means of an insulating connector 47.

When this probe is immersed in a cavitated liquid, the cavitational forces impinging on the thin-wall tubing produce mechanical distortion of the cylinder 32, thus causing a voltage across the electrodes, tubing 30 and conductor 42. It will be obvious that the higher the intensity of the cavitation, the greater the voltage variation. In order to minimize a conduction of forces along the length of the tubing 30, the tubing may be provided with a sound absorbing sleeve 48, beginning slightly above the area occupied by the piezoelectrical pickup cylinder 32. It may be noted, moreover, that the piezoelectric cylinder 32 is responsive primarily to radial forces, that is, cavitational forces impinging in a horizontal direction and, therefore, is sensitive to the cavitation which cleans the material normally immersed in the tank.

FIGURE 3 shows the electrical circuit used with this probe. The piezoelectric cylinder 32 is connected to a high-pass filter 50 which comprises two capacitors 52, 54, and two choke coils 56 and 58. This filter 50 is dimensioned to pass radio frequency signals which have a frequency above one megacycle per second, and most suitably above two megacycles per second. Thus, essentially only white noise is passed from the filter to the input of a radio frequency amplifier 60. The output from the amplifier 60 is coupled via a coupling capacitor 62 to a bridge circuit 70. This bridge circuit comprises a radio frequency choke coil 72, a resistor 74, a corresponding resistor 78, an adjustable resistor 76, a resistive element 80, and a corresponding resistive element 82. The bridge circuit is energized by a source of direct current supply 84. The indicating arm of the bridge circuit includes a radio frequency choke coil 86 and a direct current voltmeter 24.

Operation of this bridge circuit may be visualized as follows: The bridge is balanced by means of the slider associated with the resistor 76 in such a way that the meter 24 is at its zero position, thus cancelling any background noise when the probe is not exposed to cavitation. When the piezoelectric pickup 32 is exposed to cavitation, the signals at the output side of the amplifier 60 reach the bridge circuit 70 through the coupling capacitor 62, but the radio frequency signals are unable to flow along the upper left side of the bridge circuit toward resistor 74, being blocked by the radio frequency choke 72. Also, the signals cannot flow toward the meter 24, being blocked by the radio frequency choke 86. Therefore, the signals will exist across the resistive element 80, most suitably a conventional fuse wire rated 0.01 amperes, 250 volts. This resistive wire is heated by the current flowing therethrough, such power being responsive to the power of the cavitation intensity. The heating of the element 80 produces an inbalance in the bridge circuit which is indicated on the meter 24. The element 82 in the right arm of the bridge circuit is provided for ambient temperature compensation. It is apparent, therefore, that the meter 24 provides an indication which is truly representative of the electrical power produced by the cavitation.

Test results have shown that the measurements made with this electrical instrument correlate extremely well with a radioactive soil removal test as indicated in FIGURE 4. The abscissa is calibrated in percentage of soil removed per unit of time, whereas the ordinate is calibrated in radio frequency volts read on the meter. The line 90 resulting from such test was a straight line, showing a linear relationship.

It is evident, therefore, that the instrument described heretofore is well suited for measuring the effectiveness of an ultrasonic cleaning unit and that such measurements can be made with great ease and facility. Additional tests carried out with the instrument according to the design shown revealed that pressure patterns can be discerned and that it is readily possible to discover so-called "dead spots" in cleaning tanks. Additionally, the instrument is well suited for monitoring the cleaning effectiveness of on-line production equipment and makes it possible to discern a change in cleaning effectiveness without delay. In automatic control systems, the meter 24 may be replaced by a servo-mechanism which maintains the generator 16 tuned to provide maximum cavitation power. This tuning, generally, is an adjustment of frequency to maintain the cleaning tank at optimum resonance conditions.

FIGURE 5 illustrates this particular arrangement wherein the output signal developed across the meter 24 is used as a feedback signal to control the operation of the generator 16.

While there has been described and illustrated a certain specific embodiment of the present invention, it will be apparent to those skilled in the art that various changes and modifications may be made therein without deviating from the broad principle and intent of this invention, which shall be limited only by the scope of the appended claims.

What is claimed is:
1. An instrument for measuring the cavitation intensity in a sonically activated liquid comprising:
   a probe adapted to be immersed in the liquid, said probe including a cylindrical piece of piezoelectric material for converting mechanical power exerted thereupon to electrical signals, and
   an electrical circuit coupled to said probe for receiving said electrical signals and providing an output which is commensurate with the cavitational power exerted upon said piezoelectric material; said circuit including the series connection of an electrical high-pass filter coupled to said piezoelectric material for passing radio frequency signals substantially in the range of one megacycle per second or more; an amplifier coupled with its input to said filter for receiving said radio frequency signals and for providing amplified output signals, and a bridge circuit coupled for receiving said output signals; said bridge circuit including a resistive element adapted to be heated by said radio frequency signals for producing an indication responsive to the degree of heat thereof, such heat being a measure of the cavitation intensity.

2. An instrument as set forth in claim 1 wherein said piece of piezoelectric material is disposed in a metal tubing.

3. An instrument as set forth in claim 1 wherein said bridge circuit comprises a second resistive element connected to serve for ambient temperature compensation, a source of direct current voltage and a direct current voltage meter connected to indicate an imbalance of said bridge circuit responsive to the heating of said resistive element by said radio frequency signals.

4. An instrument as set forth in claim 3 wherein said resistive elements comprise fuse wire.

5. An instrument for testing the cavitation intensity in a sonically cavitated liquid comprising:
   a probe adapted to be immersed in the liquid, said probe including a tubing for supporting a cylindrical piezoelectric transducer which converts mechanical power exerted thereupon by the cavitation of the liquid to electrical signals;
   an electrical circuit coupled to said probe for receiving said signals and providing an indication commensurate with the cavitational power exerted upon said transducer; said circuit including the series combination of an electrical high-pass filter coupled to said transducer and passing radio frequency signals in the range of one megacycle per second or more; an amplifier coupled with its input to said filter for receiving said radio frequency signals and for providing amplified output signals, and a bridge circuit coupled for receiving said ouptut signals; said bridge circuit including a balancing network of resistors, a source of electrical potential, a meter for indicating the balanced condition of said circuit, and a resistive element adapted to be heated by said radio frequency signals, whereby the change of electrical resistance of said element responsive to such heating produces in said circuit an imbalance which is manifest on said meter.

6. A control system for an ultrasonic cleaning system which comprises:

a tank adapted to contain a liquid into which articles to be cleaned are immersed;

means for cavitating the liquid;

a generator for supplying energy in the ultrasonic frequency range to said means for cavitating the liquid;

a control system for sensing the cavitation intensity in the liquid and coupled to adjust the frequency supplied to said means for cavitating the liquid in response to the sensed cavitation intensity;

said control system including a piezoelectric transducer immersed in the liquid for producing electrical signals responsive to the cavitation intensity; a high-pass filter for receiving said signals and passing only signals in the radio frequency range substantially above one MHz; an amplifier for amplifying said signals and a controlled instrumentality for receiving said amplified radio frequency signals and controlling the frequency of said generator responsive to said signals.

References Cited

UNITED STATES PATENTS

| 2,497,094 | 2/1950 | Moreno | 324—98 XR |
| 3,240,674 | 3/1966 | Ledwidge | 73—69 XR |
| 3,254,284 | 5/1966 | Tomes | 340—10 XR |
| 3,320,581 | 5/1967 | Sims | 340—10 |

OTHER REFERENCES

Macrosonics Corporation Bulletin P-104, "Macrosonics Cavitation Meter." Published by Macrosonics Corporation, 1001 Roosevelt Ave., Carteret, N.J., August 1965.

ROBERT W. JENKINS, *Primary Examiner.*

U.S. Cl. X.R.

73—67; 134—57; 259—1